United States Patent
Bahns (10) Patent No.: US 9,342,511 B2
(45) Date of Patent: May 17, 2016

(54) FAST SELECTION IN HARDWARE OR SOFTWARE

(71) Applicant: RAYTHEON COMPANY, Waltham, MA (US)

(72) Inventor: Michael T. Bahns, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 264 days.

(21) Appl. No.: 13/963,397

(22) Filed: Aug. 9, 2013

(65) Prior Publication Data

US 2015/0046448 A1 Feb. 12, 2015

(51) Int. Cl.
*G06N 5/00* (2006.01)
*G06F 17/30* (2006.01)

(52) U.S. Cl.
CPC ............... *G06F 17/30* (2013.01); *G06N 5/003* (2013.01)

(58) Field of Classification Search
CPC ...................................................... G06N 5/003
USPC ............................................................. 706/14
See application file for complete search history.

(56) References Cited

PUBLICATIONS

Liu et al ("Integrated Feature Selection and Higher-order Spatial Feature Extraction for Object Categorization" 2008).*
Chen et al ("An efficient bit-based feature selection method" 2008).*
Bellens et al ("Parallel Implementation of the Integral Histogram").*

* cited by examiner

*Primary Examiner* — Lut Wong
(74) *Attorney, Agent, or Firm* — Cantor Colburn LLP (57) ABSTRACT

In an exemplary embodiment, a computer-implemented method includes receiving an instruction to select an output set from an input set, where the output set is a top subset or a bottom subset of the input set, where the input set comprises a plurality of members, and where each member of the input set includes a plurality of bits. A first subset of the plurality of bits is selected. A histogram is generated, by a computer processor, based on the values in the first subset of the plurality of bits. A threshold value of the input set is determined, where the threshold value separates the values of the output set from the values of the remainder of the input set, and where the threshold value is based at least in part on the histogram. The output set is then extracted from the input set based on the threshold value.

19 Claims, 5 Drawing Sheets

|  | below mask | histogram within masked region (-) | | | | | | | | above mask |
|---|---|---|---|---|---|---|---|---|---|---|
| bin: | - | 0 | 1 | 2 | 3 | 4 | 5 | 6 | 7 | - |
| hist: | 0 | 1 | 1 | 1 | 2 | 5 | 6 | 7 | 0 |
| anti-hist: | 16 | 16 | 15 | 14 | 13 | 12 | 10 | 5 | 3 | 2 | 0 |

Fig. 3C

|  | below mask | histogram within masked region (5) | | | | | | | | above mask |
|---|---|---|---|---|---|---|---|---|---|---|
| bin: | - | 0 | 1 | 2 | 3 | 4 | 5 | 6 | 7 | - |
| hist: | 6 | 0 | 0 | 1 | 0 | 2 | 0 | 1 | 1 | 5 |
| anti-hist: | 16 | 10 | 10 | 10 | 9 | 9 | 7 | 7 | 6 | 5 |

FAST SELECTION IN HARDWARE OR SOFTWARE

BACKGROUND

Various embodiments of this disclosure relate to fast selection and, more particularly, to selecting a subset of data using a hardware or software implementation.

There are many circumstances in data manipulation where one might want to select a top subset or a bottom subset of a particular set of data. Typical approaches to this problem are based on adaptations of sorting algorithms. For example, the data can be iteratively divided at its median, until the top data elements of the desired quantity have been arranged together. Alternatively, instead of dividing the data based on a median value, a random value may be chosen, which avoids the time taken to locate the median but provides less predictable divisions. At worst case, these methods can be performed, respectively, in order-N time and order-$N^2$ time.

Algorithms that run in under order-N time generally require storing the data in binary trees or heaps, which is often impractical, and the resulting sub-order-N time discounts the upfront cost of composing the data structures needed. These upfront costs can be prohibitive with large data sets.

The above approaches are generally not well suited to hardware implementations, and they make no effort to accommodate the limitations of modern processor memory architectures.

SUMMARY

In one embodiment of this disclosure, a computer-implemented method includes receiving an instruction to select an output set from an input set, where the output set is a top subset or a bottom subset of the input set, where the input set comprises a plurality of members, and where each member of the input set includes a plurality of bits. A first subset of the plurality of bits is selected. A histogram is generated, by a computer processor, based on the values in the first subset of the plurality of bits. A threshold value of the input set is determined, where the threshold value separates the values of the output set from the values of the remainder of the input set, and where the threshold value is based at least in part on the histogram. The output set is then extracted from the input set based on the threshold value.

In another embodiment, a system includes an initialization unit, a histogram unit, and an extraction unit. The initialization unit is configured to receive an instruction to select an output set from an input set, where the output set is one of a top subset and a bottom subset of the input set, where the input set comprises a plurality of members, and where each member of the input set includes a plurality of bits. The initialization unit is further configured to select a first subset of the plurality of bits for processing. The histogram unit is configured to generate a histogram based on the values in the first subset of the plurality of bits. The extraction unit is configured to determine a threshold value of the input set, where the threshold value separates the values of the output set from the values of the remainder of the input set, and where the threshold value is based at least in part on the histogram. The extraction unit is further configured to extract the output set from the input set based on the threshold value.

In yet another embodiment, a computer program product includes a computer readable storage medium having computer readable program code embodied thereon. The computer readable program code is executable by a processor to perform a method. The method includes receiving an instruction to select an output set from an input set, where the output set is a top subset or a bottom subset of the input set, where the input set comprises a plurality of members, and where each member of the input set includes a plurality of bits. Further according to the method, a first subset of the plurality of bits is selected. A histogram is generated, by a computer processor, based on the values in the first subset of the plurality of bits. A threshold value of the input set is determined, where the threshold value separates the values of the output set from the values of the remainder of the input set, and where the threshold value is based at least in part on the histogram. The output set is then extracted from the input set based on the threshold value.

Additional features and advantages are realized through the techniques of this disclosure. For a better understanding of these advantages and features, refer to the description and to the drawings.

BRIEF DESCRIPTION OF THE DRAWINGS

Reference is now made to the following brief description, taken in connection with the accompanying drawings and detailed description, wherein like reference numerals represent like parts.

DETAILED DESCRIPTION

Various embodiments of this disclosure enable efficient selection of a top or bottom subset from an input set.

Figure 1:
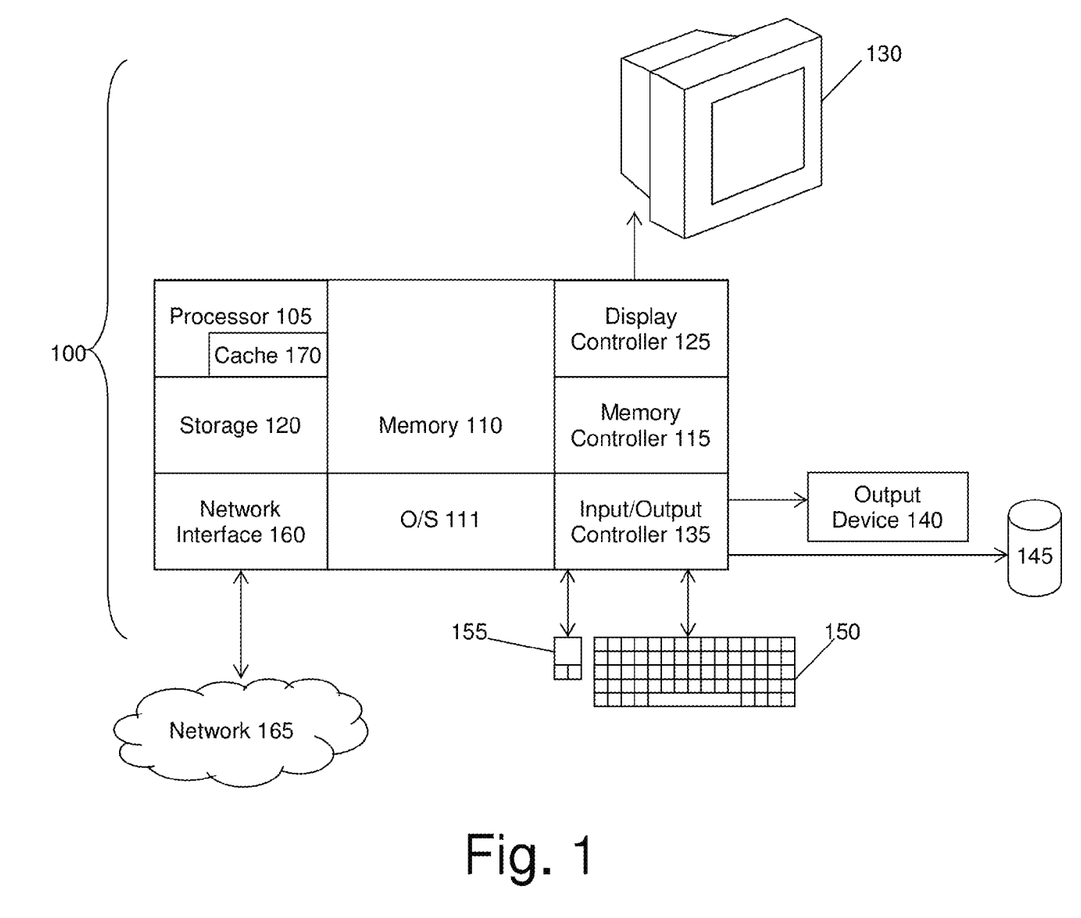
FIG. 1 is a block diagram of a computing device for implementing some or all aspects of a selection system, according to an exemplary embodiment of this disclosure.

FIG. 1 illustrates a block diagram of a computer system 100 for use in implementing a selection system or method according to some embodiments. The selection systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Selection systems and methods according to this disclosure may be embodied, in whole or in part, in computer program products or in computer systems 100, such as that illustrated in FIG. 1.

Figure 2:
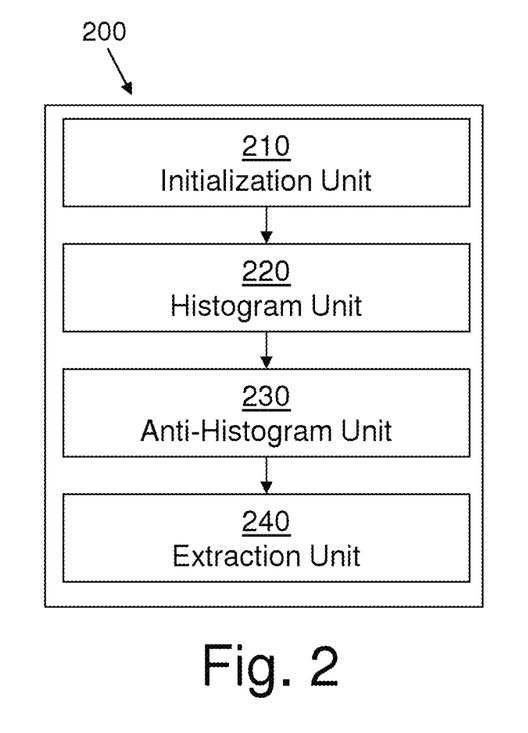
FIG. 2 is a block diagram of the selection system, according to an exemplary embodiment of this disclosure.

FIG. 2 is a block diagram of a selection system 200, according to an exemplary embodiment of this disclosure. As shown, the selection system 200 may include an initialization unit 210, a histogram unit 220, an anti-histogram unit 230, and an extraction unit 240. Each of these units may be made up of hardware, software, or a combination thereof. Although these units are described herein as being distinct components, this need not be the case. Hardware, software, or both may be shared across multiple units. Rather, the division between the initialization unit 210, the histogram unit 220, and the anti-histogram unit 230 is provided herein for illustrative purposes, and to demonstrate various operations of the selection system 200 as a whole.

The selection system 200 may be configured to receive data represented by an input set of N members, and to provide an output set of K members, where K is less than N and the output set is a subset of the input set. It will be understood that, in some cases, the input set may be a set of database records or other data in which each member contains multiple fields. In that case, the various operations of the selection system 200 may apply to a particular field across the members of the input set, so as to select a subset of the input set based on that field.

The selection system 200 may be enabled to select the topmost or bottommost values within the input set. Generally, an exemplary embodiment of the selection system 200 employs histograms, anti-histograms (i.e., integrals of histogram data), and data masking to determine a threshold value within the input set. Only values in the input set that are above the threshold or below the threshold, depending on whether the top or bottom values are desired, may become part of the output set.

In general, the initialization unit 210 may select parameters for operations performed by the histogram unit 220 and the anti-histogram unit 230. The histogram unit 220 and the anti-histogram unit 230 may then perform one or more passes through the data, performing tasks that will be described further below. After the passes are complete, the extraction unit 240 may extract the top or bottom members identified by the passes.

The initialization unit 210 may determine histogram parameters based on the size of the input set and the number of bits needed to represent the members of the input set. For example, the histogram parameters determined may include a histogram bin count, a dynamic range of each bin, and a number of passes required to resolve the threshold value. These parameters may be dependent on one another in some respects.

Various policies may be used by the initialization unit 210 to select the histogram parameters. The policy used by a particular embodiment may be somewhat arbitrary, but may take into consideration that too many bins use too much memory, and too few bins provide reduced effectiveness during each pass through the input set. In general, the number of bins may increase with increasing size of the data in the input set, i.e., the number of bit needed to represent the data.

For example, suppose the data in an input set is represented by 32 bits, where 10 million members are in the set. To avoid having to make numerous passes through this large input set, the initialization unit 210 may choose a relatively small number of passes to be performed over this input set. The number of passes may generally be inversely proportionate to the number of bins. Thus, the initialization unit 210 may select a relatively large bin count to correspond to the large quantity and size of data in the input set. If it is determined that no more than four passes should be made through the data, then each pass may handle 8 of those 32 bits. It will be understood that, alternatively, more passes may be made with a lesser number of bits being handled during each pass, or fewer passes may be made with a greater number of bits being handled at each pass. Furthermore, it need not be necessary for each pass to address the same number of bits as other passes. In some embodiments, the bin count may vary with each pass through the input set. In hardware implementations, however, optimal use of memory suggests using the same histogram bin count in each pass.

Returning to the example, four passes are to be made with each pass handling 8 bits of the data. For each pass, the initialization unit 210 may assign one bin for each possible value of the bits being considered. Thus, in this example, $2^8$ bins may be used for each pass. Alternatively, in some embodiments, a bin may be assigned multiple values for the bits being considered. For a further example, $2^7$ bins may be used if each bin corresponds to two values, where 8 bits are being considered in the current pass, instead of having a one-to-one ratio between bins and values. Such an implementation, however, may be less practical then simply choosing to handle 7 bits of the data in that pass, since in either case it is 7 bits of data that are being resolved.

After the parameters are determined, the histogram unit 220 may generate a histogram of values in the input set. In some embodiments, the histogram may be represented by an array, or other appropriate structure, where each bin of the structure includes a count of the quantity of members in the input set whose considered bits correspond to the assigned value of that bin. More particularly, for each member of the input set, the histogram unit 220 may consider that member; determine the value of the bits of the member, where the bits in question include those being considered in the current pass; and then place the member in the bin that was assigned to the value of that set of bits. For example, in the example described above, where the first past considers that top 8 significant bits of a total 32 bits, the histogram unit 220 may assign each member of the input set to a bin based on the value of the most significant 8 bits of that member.

Figure 3A:
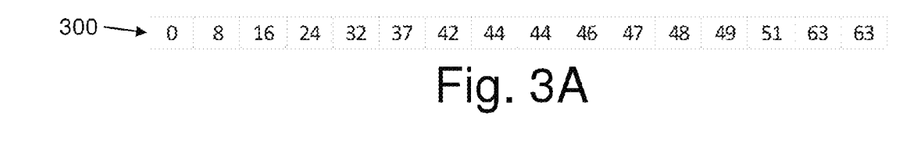
FIGS. 3A-3D show an example selection being performed by the selection system, according to an exemplary embodiment of this disclosure.

FIGS. 3A-3D illustrate a simple example of data evaluated by the selection system 200, according to an exemplary embodiment of this disclosure. FIG. 3A shows the 16 members of this exemplary input set 300. As all members of the input set 300 are less than 64, the members of the input set 300 can be represented by 6 bits each. In this example, the initialization unit 210 decided to perform 2 passes through the input set 300, with each pass considering 3 bits of the data.

Figure 3B:
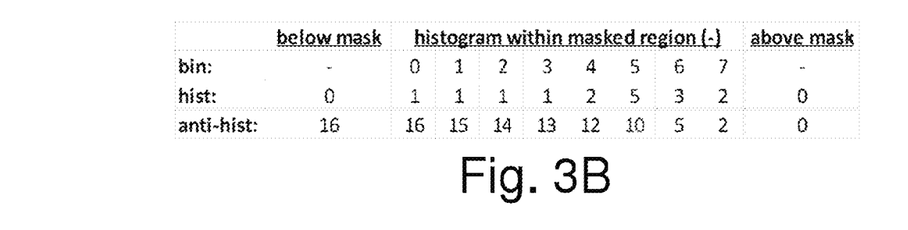

FIG. 3B illustrates the result of the first pass through the input set 300, performed by both the histogram unit 220 and the anti-histogram unit 230. The most significant 3 bits of the input set 300 can have values ranging from 0 to 7, as these values can be represented by 3 bits of data. In FIG. 3B, the bins are indexed with these values, and the histogram unit 220 assigns each member of the input set 300 to the bin with the matching value for the most significant 3 bits of that member. FIG. 3B illustrates the quantity of members of the input set 300 in each bin after the histogram unit 220 performs its first pass. As shown, the histogram unit 220 found that {1, 1, 1, 1, 2, 5, 3, 2} were the quantities of members with their top 3 bits being equal to, respectively, {0, 1, 2, 3, 4, 5, 6, 7}.

After the histogram is generated, the anti-histogram unit 230 may generate an anti-histogram based on the histogram, where an anti-histogram is an integral of the histogram. The anti-histogram may provide a count of the cumulative quantity of members that are in the bins, starting from either the highest bin or the lowest. In an exemplary embodiment, the anti-histogram unit 230 starts counting from the highest bin if the selection system 200 seeks to select the topmost members of the input set 300, and starts from the lowest bin if the selection system 200 seeks to select the bottommost members. In the example of FIGS. 3A-3D, the selection unit 200 seeks to provide the top 8 members of the input set 300. Thus, the anti-histogram may begin counting members in the histogram starting from the highest bin.

Based on the counts provided, the anti-histogram unit 230 may determine which bin holds the threshold value. The threshold value is the value of the member that separates the members belonging in the output (i.e., the top 8 values in this example) from the members that do not belong in the output.

Returning the above example, as shown in FIG. 3B, after the quantities in Bins 7, 6, and 5 have been considered, the anti-histogram unit 230 sees a total of 10 members in these bins. Further, because the most significant bits were considered by the histogram unit 220 in its first pass, it is known that the members in Bins 4, 3, 2, and 1 all have lower values than the members in bins 5, 6, and 7. Additionally, it is known that the members in bins 6 and 7 have higher values than those in bin 5. Because the anti-histogram unit 230 determines that only 5 members exist between bins 6 and 7, and 10 members exist between bins 5, 6, and 7, the anti-histogram unit 230 may further determine that the threshold value in this case is currently in bin 5. This is because the selection unit 200 is tasked with finding the top 8 members.

In some cases, the anti-histogram may determine that exactly the quantity of members desired is found in a subset of the bins. For instance, in this example, if the selection unit 200 were looking for the top 5 members, it has already been determined by the anti-histogram unit 230 that those top members can be found in Bins 6 and 7. In that case, any additional passes through the input set 300 that were planned could be skipped, and the threshold value could be deemed to be the lowest value in Bin 6.

On the other hand, if the threshold value is not identified during a pass, as in the above example that seeks the top 8 values, an additional pass may be performed. Prior passes will have narrowed the scope of the search for the threshold value, by identifying the bin in which the threshold value must be found. In this case, that is Bin 5. Thus, only that bin need be examine in the following pass.

Figure 3C:
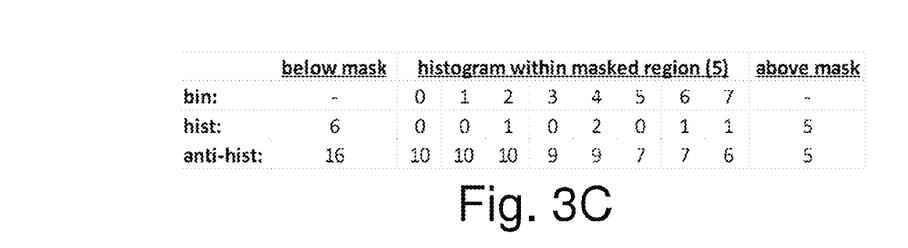

FIG. 3C shows the results of the histogram unit 220 and the anti-histogram unit 230 operating, in a second pass, on the members of the original Bin 5 from the first pass. Because Bin 5 had only 5 members, only these 5 members need be examined in this second pass through the input set 300. This time around, the lower 3 bits of data are considered for these 5 members whose top 3 bits put them in bin 5.

As also shown in FIG. 3C, when the anti-histogram unit 230 begins its count, from the top bin to the bottom bin, the count is initialized at 5, as the selection unit 200 has already identified in the prior pass that 5 members of the input set 300 (from original Bins 6 and 7) should be part of the output. Thus, the anti-histogram unit 230 is searching for the bin in this second pass that brings this count to 8, as the selection unit 200 is seeking the top eight members of the input set 300. Alternatively, in some embodiments, the anti-histogram unit 230 may initialize its count at 0 in this second pass, while searching for 3 additional members (instead of 8 total members) to add to the output.

At Bin 5 of the second pass, the anti-histogram unit's count reaches 7, and the count reaches 9 at Bin 4. Thus, the anti-histogram unit 230 determines that the threshold value (which separates the top 8 members from the remainder of the input set 300) is in Bin 4. No more passes through the input set 300 can be performed because, between the two passes already performed, all bits of the input set 300 have been examined. Thus, the fact that there are multiple members of Bin 4 indicates that these members have the same value as each other. More specifically, that value is 44, which is exactly determined based on the top 3 bits being 5 (i.e., being placed in Bin 5 in the first pass) and the bottom three bits being 4 (i.e., being placed in Bin 4 in the second pass). Accordingly, in this example, the threshold value for the input set is 44, and 2 members exist with this value. Because the selection system 200 seeks only the top 8 values, and because including both members with the value 44 would result in the top 9 values, it is further determined that only a single of these 44-valued members should be included among the top 8 members of the input set 300.

In this example, only two passes through the input set 300 can be performed, as all bits have been considered after two passes. In other circumstances, only one pass may be necessary, or additional passes may be necessary. For example, if remaining bits have yet to be resolved and the top or bottom requested members cannot yet be determined, then an additional pass may be performed by the histogram unit 220 and the anti-histogram unit 230. Passes may continue repeatedly until the threshold value is sufficiently resolved, which in some cases may require examining all bits of the input set 300, but in other cases may not.

It will be understood that resolving the threshold value sufficiently need not mean resolving it exactly (i.e., resolving each and every bit of the threshold value) in every case. For example, if two passes are made through the input set, where three passes were possible given the bits considered at each pass, then not all bits would have yet been resolved. However, in some cases, the sought top or bottom members of the input set 300 may already be determinable based on their location in the bins (e.g., when the top bin contains exactly the number of members sought). In that case, the lowest possible value of members in the threshold bin may be used for the threshold value, if the topmost members are sought. Analogously, if the bottommost members are sought, then the highest possible value of members in the threshold bin may be used as the threshold value.

After the necessary passes have been performed, the extraction unit 240 may be aware of the threshold value, based on the passes made by the histogram unit 220 and the anti-histogram unit 230. The extraction unit 240 may also be aware, when applicable, that multiple members of the input set 300 exist with the threshold value and, in that case, how many of such members are needed in the output set. Thus, the extraction unit 240 may step through the members of the input set 300, extracting all the members above or below (depending on the whether the top or bottom members are desired) the threshold value. If multiple members exist with the threshold value, only the quantity needed to meet the output requirements may be extracted.

Figure 3D:
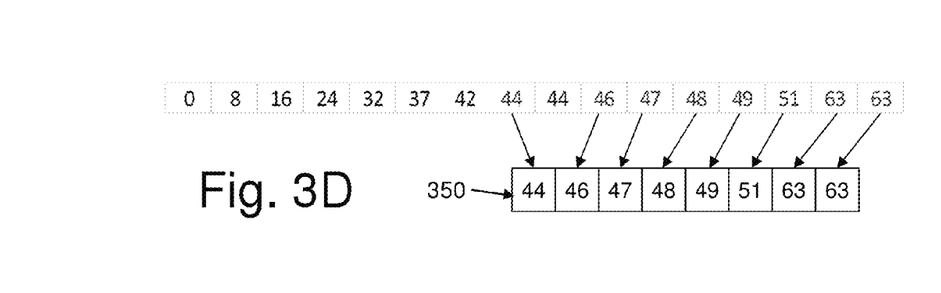

Returning to the above example, FIG. 3D illustrates a block diagram of the output set 350, being extracted from the input set 300, according to this example. As shown, all values above the threshold value of 44 are added to the output set 350. Because only one member with the threshold value is needed in this case, the first member having that value is also added to the output set 350, while the other member with that value is ignored.

Figure 4:
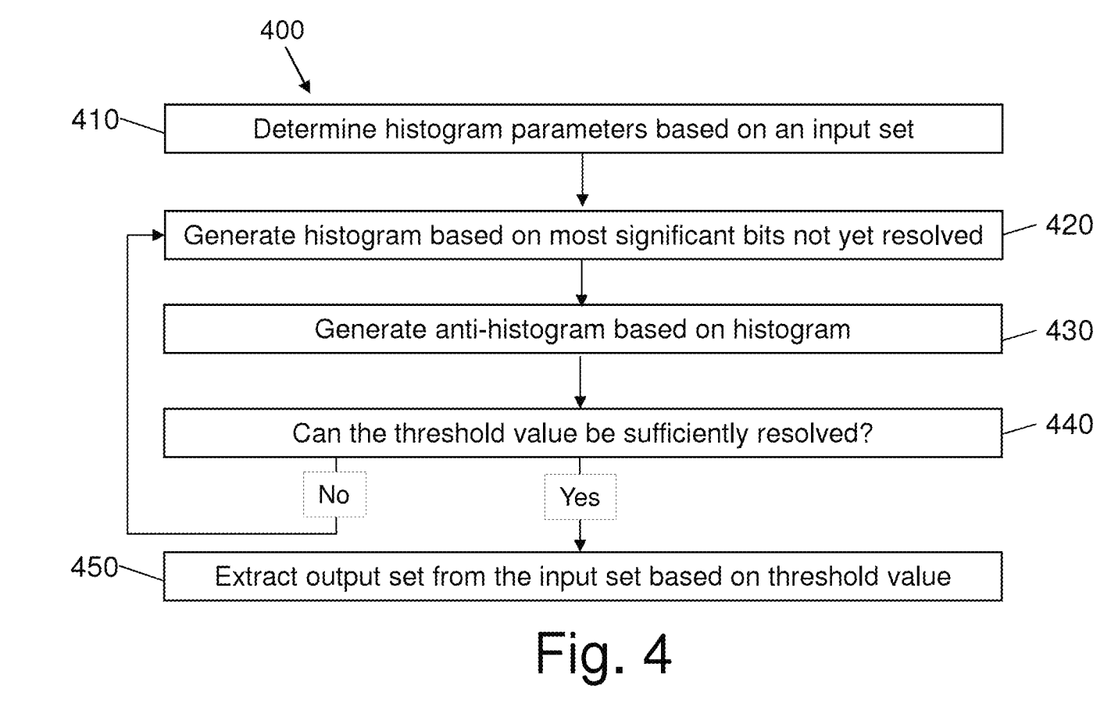
FIG. 4 is a flow diagram of a method for selecting a top or bottom subset from an input set, according to an exemplary embodiment of this disclosure.

FIG. 4 is a flow diagram of a method 400 for selecting a top or bottom subset of an input set, according to an exemplary embodiment of this disclosure. At block 410, histogram parameters are determined for an input set 300. At block 420, a histogram is generated on the most significant bits of the input set that have yet to be resolved. At block 430, an anti-histogram is generated based on the histogram. At decision block 440, it is determined whether a threshold value can be sufficiently resolved based on the prior histogram and anti-histogram. If not, the method returns to block 420 to begin an additional pass through the input set 300. On the other hand, if the threshold value is sufficiently determinable, then the method moves to block 450. At block 450, the sought top or bottom values of the input set are extracted.

A straight-forward approach to implementing a single pass through the input set 300, using the histogram unit 220 and the anti-histogram unit 230, is to process a single member at a time, incrementing a counter corresponding to each histogram bin. Upon completion, the histogram bins would be indexed in order and summed to produce the anti-histogram calculation. Execution time for such an implementation is on the order of N+B1, where N is the quantity in the input set 300 and B is the number of bins being used.

Figure 5:
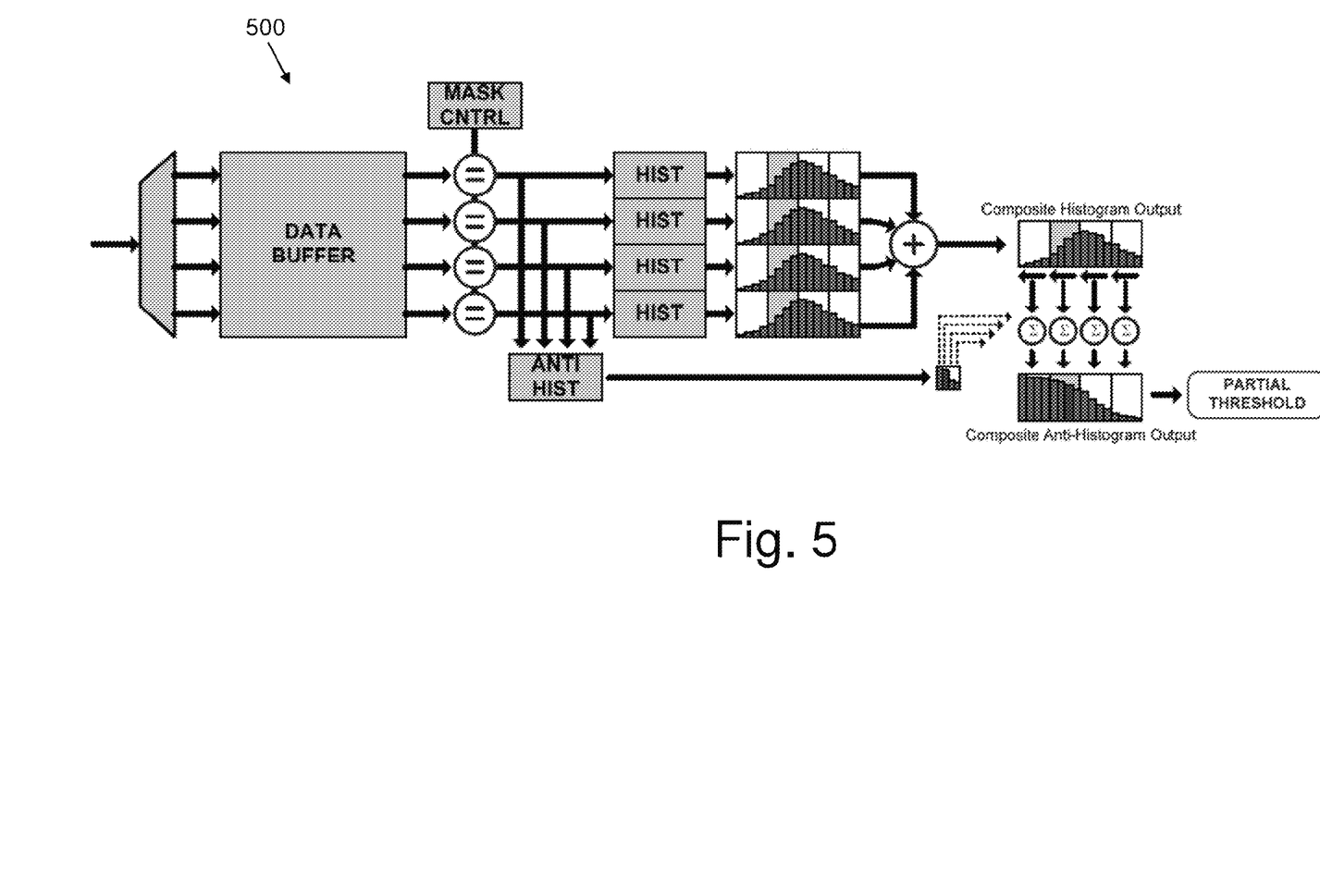
FIG. 5 is a block diagram of an implementation of the selection system, according to an exemplary embodiment of this disclosure.

Some exemplary embodiments of the selection system 200 may use a more efficient implementation. FIG. 5 is a block diagram of this more efficient implementation 500, which is in accordance with an exemplary embodiment of this disclosure. It will be understood that other embodiments and implementations are also within the scope of this disclosure. Further, some embodiments may be configured to perform selection in hardware, software, or a combination of both, such as by way of parallel hardware and software execution. The depicted embodiment and accompanying description are provided for illustrative purposes only.

In this embodiment, the histogram unit 220 may operate with a multi-channel input data stream to minimize histogram formation time. After the histogram is formed, the anti-histogram performance may be accelerated through parallel execution.

The input set 300 may be streamed into the histogram unit 220 across C input channels, where C is greater than 1 and the input set 300 is divided between the channels. In FIG. 4, C is equal to 4. Accordingly, each channel receives a portion of the input set 300, thus accelerating the histogram formation by a factor of C. The histogram unit 230 may independently histogram the data in each of the C channels. In some embodiments, a distinct thread or process within the histogram unit 230 may be used for each channel. The histogram bins may be stored in memory or, if the number of bins is sufficiently small, in registers.

For hardware implementations, care may be taken to correctly manage the read-modify-write (R-M-W) updates, so the bin counts are not corrupted by back-to-back same-bin data sequences when the histogram bin memory requires a multi-cycle access latency. Additionally, the anti-histogram acceleration, which is described further below, may require co-storage of multiple bins, which may also be considered when mitigating R-M-W corruption.

While this histogramming is performed, some anti-histogramming may be performed in parallel to accelerate the anti-histogramming process performed after the histogramming, using B2 as the number of bins. In FIG. 4, B2 is shown as being equal to C (the number of channels), but this need not be the case.

The histogram bins may be organized in allotted memory such that the $\log_2(B2)$ most significant bits of the bin index encode the offset within a memory that is sized to accommodate B2 histogram bins per address. Accordingly, the least significant bits of the address (i.e., the offset within the word of that memory) correspond to the B2 regions of the histogram.

During histogram formation, the B2-bin anti-histogram may be performed in real time to determine the base counts for each of the B2 segments of the histogram bins. After all members of the input set 300 have been histogrammed, the real-time, B2-bin anti-histogram values may be combined with the cumulating sum across all C of the histogram memories as they are read. For software implementations, the histogram bins may be packed so that vector-adds can be used to sum the histogram bins. The output of this may be organized into B2 sets.

Within the same pass as the above, an additional bottom-up anti-histogram may be generated, by tracking the total histogram count and subtracting the running integrals. During anti-histogramming, all addresses of the histogram bin memories may be sequenced and zeroed out in preparation for the next use.

Some embodiments may exploit the inherent parallelism of exemplary selection systems 200 and methods 400 by distributing the data storage, histogram, anti-histogram, data extraction functions, or a combination thereof across multiple processing elements in hardware, across multiple processors in software, or across a combination of hardware and software. In this way, N processing elements can reduce the execution time by a factor of nearly N. Some loss of efficiency might result from combining the anti-histograms from each processor into a single composite anti-histogram that can be used to determine the threshold value for the full input set 300. In an exemplary embodiment, the input set 300 may be distributed evenly across N independent memory units, one for each processing element, but many combinations of the number of processing elements and the number of data storage units may result in improved execution time.

While various embodiments of the selection system 200 have been disclosed in exemplary forms, many modifications, additions, and deletions can be made without departing from the spirit and scope of this disclosure and its equivalents, as set forth in the following claims.

The corresponding structures, materials, acts, and equivalents of all means or step-plus-function elements in the claims below are intended to include any structure, material, or act for performing the function in combination with other claimed elements. This disclosure has been presented for the purposes of illustration and description, but is not intended to be exhaustive or limiting. Many modifications and variations will be apparent to those of ordinary skill in the art without departing from the scope and spirit of this disclosure. The embodiments described herein were chosen and described in order to best explain the principles of the selection system 200 and the practical applications, and to enable those of ordinary skill in the art to understand this disclosure.

What is claimed is:

1. A computer-implemented method for extracting a subset of database records, comprising:
   receiving an instruction to select an output set from an input set of database records, wherein the output set is one of a top subset and a bottom subset of the input set, wherein the input set comprises a plurality of members representing the database records, and wherein each member of the input set comprises a set of bits;
   selecting a number of bits, X, to examine in the each of the plurality of members, wherein the selecting comprises:
   selecting a plurality of subsets of X bits corresponding to the plurality of members of the input set, each of the subsets of X bits corresponding to a member of the input set, and each of the subsets of X bits comprising a subset of the set of bits of the corresponding member and excluding one or more bits of the set of bits of the corresponding member; and
   determining a plurality of bin values for the plurality of members of the input set, wherein the determining the bin value for each member comprises determining a value of the subset of X bits corresponding to the member in the plurality of the subsets of bits;
   generating, by a computer processor, a histogram based on the plurality of bin values for the plurality of members, wherein the histogram comprises a plurality of bins, and wherein the generating comprises assigning each member to a bin of the histogram corresponding to the bin value of the member;
   determining a threshold value of the input set, wherein the threshold value separates the values of the subsets of bits corresponding to the members in the output set from the values of the subsets of bits corresponding to the members in a remainder of the input set, and wherein the threshold value separates the bins in the histogram into two groups of bins; and
   extracting the output set from the input set based on the threshold value and the plurality of bin values for the plurality of members.

2. The method of claim 1, further comprising generating an anti-histogram based on the histogram, wherein determining the threshold value of the input set is based at least in part on the anti-histogram.

3. The method of claim 2, further comprising generating the histogram and generating the anti-histogram an additional one or more times until the threshold value is determinable.

4. The method of claim 3, further comprising resolving at least a portion of the threshold value during each pass of generating the histogram and generating the anti-histogram.

5. The method of claim 3, further comprising determining an expected number of passes through the input set, wherein each pass comprises generating the histogram and generating the anti-histogram, and wherein the expected number of passes is based at least in part on the quantity of bits in in each of the plurality of subsets of bits.

6. The method of claim 1, further comprising generating an anti-histogram based on the histogram, wherein generating the anti-histogram based on the histogram comprises generating an integral of the histogram, and wherein determining the threshold value of the input set is based at least in part on the anti-histogram.

7. The method of claim 1, wherein the generating the histogram based on the plurality of bin values comprises:
   streaming the input set across two or more channels of a hardware device; and
   histogramming in parallel data of the two or more channels on the hardware device.

8. A system for extracting a subset of database records, comprising:
   an initialization unit configured to:
   receive an instruction to select an output set from an input set of database records, wherein the output set is one of a top subset and a bottom subset of the input set, wherein the input set comprises a plurality of members representing the database records, and wherein each member of the input set comprises a set of bits; and
   select a number of bits, X, to examine in the each of the plurality of members, by selecting a plurality of subsets of X bits corresponding to the plurality of members of the input set, each of the subsets of X bits corresponding to a member of the input set, and each of the subsets of X bits comprising a subset of the set of bits of the corresponding member and excluding one or more bits of the set of bits of the corresponding member;

a computer processor of a histogram unit configured to:
determine a plurality of bin values for the plurality of members of the input set, wherein the determining the bin value for each member comprises determining a value of the subset of X bits corresponding to the member in the plurality of the subsets of bits; and
generate a histogram based on the plurality of bin values for the plurality of members, wherein the histogram comprises a plurality of bins, and wherein the generating comprises assigning each member to a bin of the histogram corresponding to the bin value of the member; and an extraction unit configured to:
determine a threshold value of the input set, wherein the threshold value separates the values of the subsets of bits corresponding to the members in the output set from the values of the subsets of bits corresponding to the members in a remainder of the input set, and wherein the threshold value separates the bins in the histogram into two groups of bins; and
extract the output set from the input set based on the threshold value and the plurality of bin values for the plurality of members.

9. The system of claim 8, further comprising an anti-histogram unit configured to generate an anti-histogram based on the histogram, wherein the extraction unit is further configured to determine the threshold value of the input set based at least in part on the anti-histogram.

10. The system of claim 9, the histogram unit and the anti-histogram being respectively configured to generate the histogram and the anti-histogram an additional one or more times until the threshold value is determinable.

11. The system of claim 10, the extraction unit being further configured to resolve at least a portion of the threshold value during repetition of the histogram unit's generating the histogram and the anti-histogram unit's generating the anti-histogram.

12. The system of claim 10, the initialization unit being further configured to determine an expected number of passes through the input set, wherein each pass comprises the histogram unit's generating the histogram and the anti-histogram unit's generating the anti-histogram, and wherein the expected number of passes is based at least in part on the quantity of bits in in each of the plurality of subsets of bits.

13. The system of claim 8, the anti-histogram unit being further configured to generate an anti-histogram based on the histogram, by generating an integral of the histogram, and wherein the extraction unit is configured to determine the threshold value of the input set based at least in part on the anti-histogram.

14. A computer program product comprising a non-transitory computer readable storage medium having computer readable program code embodied thereon, the computer readable program code executable by a processor to perform a method for extracting a subset of database records, the method comprising:
receiving an instruction to select an output set from an input set of database records, wherein the output set is one of a top subset and a bottom subset of the input set, wherein the input set comprises a plurality of members representing the database records, and wherein each member of the input set comprises a set of bits;

selecting a number of bits, X, to examine in the each of the plurality of members, wherein the selecting comprises:
selecting a plurality of subsets of X bits corresponding to the plurality of members of the input set, each of the subsets of X bits corresponding to a member of the input set, and each of the subsets of X bits comprising a subset of the set of bits of the corresponding member and excluding one or more bits of the set of bits of the corresponding member; and determining a plurality of bin values for the plurality of members of the input set, wherein the determining the bin value for each member comprises determining a value of the subset of X bits corresponding to the member in the plurality of the subsets of bits;

generating a histogram based on the plurality of bin values for the plurality of members, wherein the histogram comprises a plurality of bins, and wherein the generating comprises assigning each member to a bin of the histogram corresponding to the bin value of the member;

determining a threshold value of the input set, wherein the threshold value separates the values of the subsets of bits corresponding to the members in the output set from the values of the subsets of bits corresponding to the members in a remainder of the input set, and wherein the threshold value separates the bins in the histogram into two groups of bins; and extracting the output set from the input set based on the threshold value and the plurality of bin values for the plurality of members.

15. The computer program product of claim 14, the method further comprising generating an anti-histogram based on the histogram, wherein determining the threshold value of the input set is based at least in part on the anti-histogram.

16. The computer program product of claim 15, the method further comprising generating the histogram and generating the anti-histogram an additional one or more times until the threshold value is determinable.

17. The computer program product of claim 16, the method further comprising resolving at least a portion of the threshold value during each pass of generating the histogram and generating the anti-histogram.

18. The computer program product of claim 16, the method further comprising determining an expected number of passes through the input set, wherein each pass comprises generating the histogram and generating the anti-histogram, and wherein the expected number of passes is based at least in part on the quantity of bits in in each of the plurality of subsets of bits.

19. The computer program product of claim 14, the method further comprising generating an anti-histogram based on the histogram, wherein generating the anti-histogram based on the histogram comprises generating an integral of the histogram, and wherein determining the threshold value of the input set is based at least in part on the anti-histogram.

* * * * *